United States Patent

Kawasaki et al.

[11] Patent Number: 5,904,605
[45] Date of Patent: May 18, 1999

[54] COOLING APPARATUS FOR OUTBOARD MOTOR

[75] Inventors: Naoki Kawasaki, Shizuoka-ken; Masayuki Nishimura, Hamamatsu, both of Japan

[73] Assignee: Suzuki Kabushiki Kaisha, Hamamatsu, Japan

[21] Appl. No.: 08/986,725

[22] Filed: Dec. 8, 1997

[30] Foreign Application Priority Data

Jan. 31, 1997 [JP] Japan .................................. P9-019463

[51] Int. Cl.$^6$ .................................................. B63H 20/24
[52] U.S. Cl. ................................................ 440/88; 440/89
[58] Field of Search ............................... 440/900, 88, 89; 60/310, 302; 123/195 P, 41.29, 41.31, 41.44, 41.47, 41.72, 41.74, 41.01

[56] References Cited

U.S. PATENT DOCUMENTS

| 5,595,515 | 1/1997 | Hasegawa et al. | 440/89 |
| 5,788,547 | 8/1998 | Ozawa et al. | 440/88 |

*Primary Examiner*—Ed L. Swinehart
*Attorney, Agent, or Firm*—Finnegan, Henderson, Farabow, Garrett & Dunner, L.L.P.

[57] ABSTRACT

A cooling apparatus for an outboard motor which is provided with a water-cooled engine in a vertical alignment in which a crank shaft is vertically disposed, the engine being composed of a cylinder block, a cylinder head and an exhaust manifold into which water jackets are formed respectively and the water jackets are supplied with cooling water from a water pump disposed below the engine in a state mounted to a hull, the cooling apparatus comprising a cylinder cooling-water passage for supplying cooling water from the water pump to the water jackets of the cylinder block and said cylinder head, an exhaust cooling-water passage for supplying cooling water from the water pump to the water jacket of the exhaust manifold, the cylinder cooling-water passage and the exhaust cooling-water passage being independently disposed from each other and being joined together at downstream portions thereof, a thermostat provided for the water jacket of the cylinder block and a sensor for detecting a temperature of a cylinder surface provided for the water jacket of the cylinder block at a portion between the water jacket thereof and the thermostat.

10 Claims, 9 Drawing Sheets

COOLING APPARATUS FOR OUTBOARD MOTOR

BACKGROUND OF THE INVENTION

The present invention relates to a cooling apparatus for a water-cooled type outboard motor.

An engine unit of an outboard motor is mounted vertically in such a manner that a crank shaft of the engine unit is disposed vertically in a mounted state. The engine unit is formed by assembling a crank case, a cylinder block and a cylinder head. Moreover, an exhaust manifold for gathering flows of exhaust gases discharged from respective cylinders to cause the exhaust gas to flow downwards is provided on one of the side surfaces of the cylinder block.

The engine unit of the structure mentioned above is provided with a cooling apparatus structured to supply sea water, river water or lake water pumped up by a water pump to a water jacket provided for the inside portions of the cylinder block, the cylinder head and the exhaust manifold, respectively.

The conventional cooling apparatus for an outboard motor has a structure that water jackets respectively provided for the cylinder block, the cylinder head and the exhaust manifold are allowed to communicate with one another to cause cooling water to flow in these elements. The water jacket of the cylinder block or the cylinder head is provided with a thermostat to adjust the flow of cooling water to be an adequate quantity to be adaptable to the water temperature to prevent the cylinder from being excessively cooled.

The thermostat is disposed above the uppermost portion of the water jacket. The reason for this arrangement is to obviate a problem which may arise in that air is accumulated in a portion upstream from the thermostat after the thermostat has been opened if the thermostat is disposed lower than the uppermost portion of the water jacket to thereby prevent sufficient circulation of the cooling water around the uppermost cylinder. In this case, the water-cooled engine cannot satisfactorily be cooled down.

Moreover, the cylinder block is provided with a cylinder-surface-temperature sensor for detecting the temperature of the wall of the cylinder and a pressure valve for controlling an oil pressure of the cooling water. In a conventional arrangement, a sensor for detecting a temperature of the cylinder surface and the pressure valve are disposed apart from the thermostat.

However, the conventional cooling apparatus for an outboard motor, having the structure that the cooling water is communicated among the water jackets for the cylinder head, the cylinder block and the exhaust manifold, suffers from deterioration in the efficiency for cooling the portion around the cylinder because of introduction of hot cooling water into the water jackets for the cylinder block and the cylinder head. Moreover, the temperature of the cooling water cannot satisfactorily be controlled by the thermostat.

Since the thermostat of the conventional cooling apparatus for an outboard motor is disposed above the uppermost portion of the water jacket, the thermostat excessively projects over the surface of the engine unit, which results in an enlargement of the size of the engine unit.

Since the cylinder-surface-temperature sensor is disposed apart from the thermostat, the temperatures detected by the cylinder-surface-temperature sensor are not stable. In particular, the temperature of the cooling water cannot easily be controlled during a warming-up operation, thus causing a problem to arise in that an excessively long time is required to warm up the engine unit. In case a breakdown of the thermostat may occur, the cylinder-surface-temperature sensor cannot detect the breakdown.

The structure, in which the pressure valve is disposed apart from the thermostat, cause pipes extending from the thermostat and the pressure valve to be disposed apart from one another. As a result, the structure of a water drainage passage becomes too complicated. Thus, the engine unit cannot easily be assembled and the maintenance of the same cannot smoothly be performed.

SUMMARY OF THE INVENTION

A primary object of the present invention is to substantially eliminate defects or drawbacks encountered in the prior art described above and to provide a cooling apparatus for an outboard motor capable of stabilizing the temperature of cooling water, which flows in water jackets of a cylinder block and a cylinder head to appropriate levels so as to improve the performance for cooling the cylinder portion and to enable a thermostat to easily control the temperature.

Another object of the present invention is to provide a cooling apparatus for an outboard motor capable of preventing undesirable enlargement of the size of the engine which occurs attributable to provision of a thermostat and stabilizing the temperatures which are detected by the thermostat so as to easily and accurately control the temperature of the cooling water, to easily and accurately assemble the cooling apparatus and to smoothly perform the maintenance of the cooling apparatus.

A further object of the present invention is to provide a cooling apparatus for an outboard motor capable of cooling exhaust passages following an exhaust manifold without excessively cooling (supercooling) the cylinder.

A still further object of the present invention is to provide a cooling apparatus for an outboard motor capable of simplifying the structure of passages for the cooling water in the cylinder block, the cylinder head and the exhaust manifold to easily manufacture the cooling apparatus.

These and other objects can be achieved according to the present invention by providing a cooling apparatus for an outboard motor which is provided with a water-cooled engine in a vertical alignment in which a crank shaft is vertically disposed, the engine being composed of a cylinder block, a cylinder head and an exhaust manifold into which water jackets are formed respectively and the water jackets are supplied with cooling water from a water pump disposed below the engine, wherein a cylinder cooling-water passage for supplying cooling water from the water pump to the water jackets of the cylinder block and the cylinder head and an exhaust cooling-water passage for supplying cooling water from the water pump to the water jacket of the exhaust manifold are independently disposed from each other, the cylinder cooling-water passage and the exhaust cooling-water passage are joined to each other at downstream portions thereof.

In preferred embodiments, the cylinder cooling-water passage is provided with a thermostat at a position higher in level than uppermost portions of the water jackets of the cylinder block and the cylinder head and lower in level than a top end of a timing belt disposed on an upper surface of the engine, in the mounted state of an outboard motor to a hull, and a sensor for detecting a cylinder surface temperature and a pressure valve are disposed adjacent to the thermostat.

The cylinder cooling-water passage and the exhaust cooling-water passage are joined so that the cooling-water flow after the joined portion thereof is introduced into a water drainage passage formed adjacent to an exhaust passage disposed vertically so as to penetrate an inside portion of an oil pan which is disposed below the engine in the mounted state. The cylinder cooling-water passage and the exhaust cooling-water passage are provided with passages downstream side of the water jackets, the downstream side passages being formed of drainage hoses, respectively, which are collectively disposed on one side surface of the engine.

In a more specified aspect, there is provided a cooling apparatus for an outboard motor which is provided with a water-cooled engine in a vertical alignment in which a crank shaft is vertically disposed, the engine being composed of a cylinder block, a cylinder head and an exhaust manifold into which water jackets are formed respectively and the water jackets are supplied with cooling water from a water pump disposed below the engine in a state mounted to a hull, the cooling apparatus comprising:

- a cylinder cooling-water passage for supplying cooling water from the water pump to the water jackets of said cylinder block and said cylinder head;
- an exhaust cooling-water passage for supplying cooling water from the water pump to the water jacket of the exhaust manifold, the cylinder cooling-water passage and the exhaust cooling-water passage being independently disposed from each other and being joined to each other at downstream portions thereof;
- a thermostat for controlling a temperature of the cooling-water passing through the cylinder cooling-water passage provided for the water jacket of the cylinder block; and
- a sensor for detecting a temperature of a cylinder surface provided for the water jacket of the cylinder block at a portion between the water jacket thereof and the thermostat.

According to the structure and characters of the present invention mentioned above, hot cooling water, which has cooled the exhaust manifold down, can be prevented from flowing into the water jackets of the cylinder block and the cylinder head. Therefore, the temperature of cooling water, which flows around the cylinder, can be stabilized to an appropriate level. Thus, the performance for cooling the cylinder portion can be improved and the temperature can be easily controlled by the thermostat.

Furthermore, according to the specific location of the thermostat, an excessive projection thereof over the upper portion of the engine can be prevented so that an undesirable enlargement of the size of the engine is prevented. Since the cylinder-surface-temperature sensor is disposed adjacent to the thermostat, the temperatures, which are detected by the sensor, can be stabilized and thus the performance for controlling the temperature of cooling water can be improved. Even if the thermostat produces trouble, the trouble can immediately be detected by the cylinder-surface-temperature sensor. Moreover, since pressure valve is disposed adjacent to the thermostat, pipes extending from the thermostat and the pressure valve are disposed adjacently. As a result, the cooling apparatus can easily and accurately be assembled and the maintenance of the same can smoothly be performed.

Still furthermore, according to the present invention, the exhaust passages are cooled down by cooling water which has cooled each water jacket. Therefore, the necessity of enlarging the quantity of cooling water to cool the exhaust passages can be eliminated, and hence, the water jackets of the cylinder block and the cylinder head are not cooled down excessively. Therefore, the exhaust passages can be cooled down without supercooling of the cylinder.

The necessity of forming passages for returning the cooling water in the cylinder block and the cylinder head can be eliminated. Therefore, the structures of the passages for the cooling water in the cylinder block and the cylinder head can be simplified and thus the engine can easily be manufactured. Since the water drainage hoses are collectively disposed on the side surface of the engine, the hose layout can easily be performed. As a result, the cooling apparatus can easily and accurately be assembled and the maintenance of the same can smoothly be performed.

Other objects, features and advantages of the present invention will be made clear from the following detailed description of the preferred embodiments described in conjunction with the accompanying drawings.

DESCRIPTION OF THE PREFERRED EMBODIMENTS

An embodiment of the present invention will be described hereunder with reference to the accompanying drawings.

Figure 1:
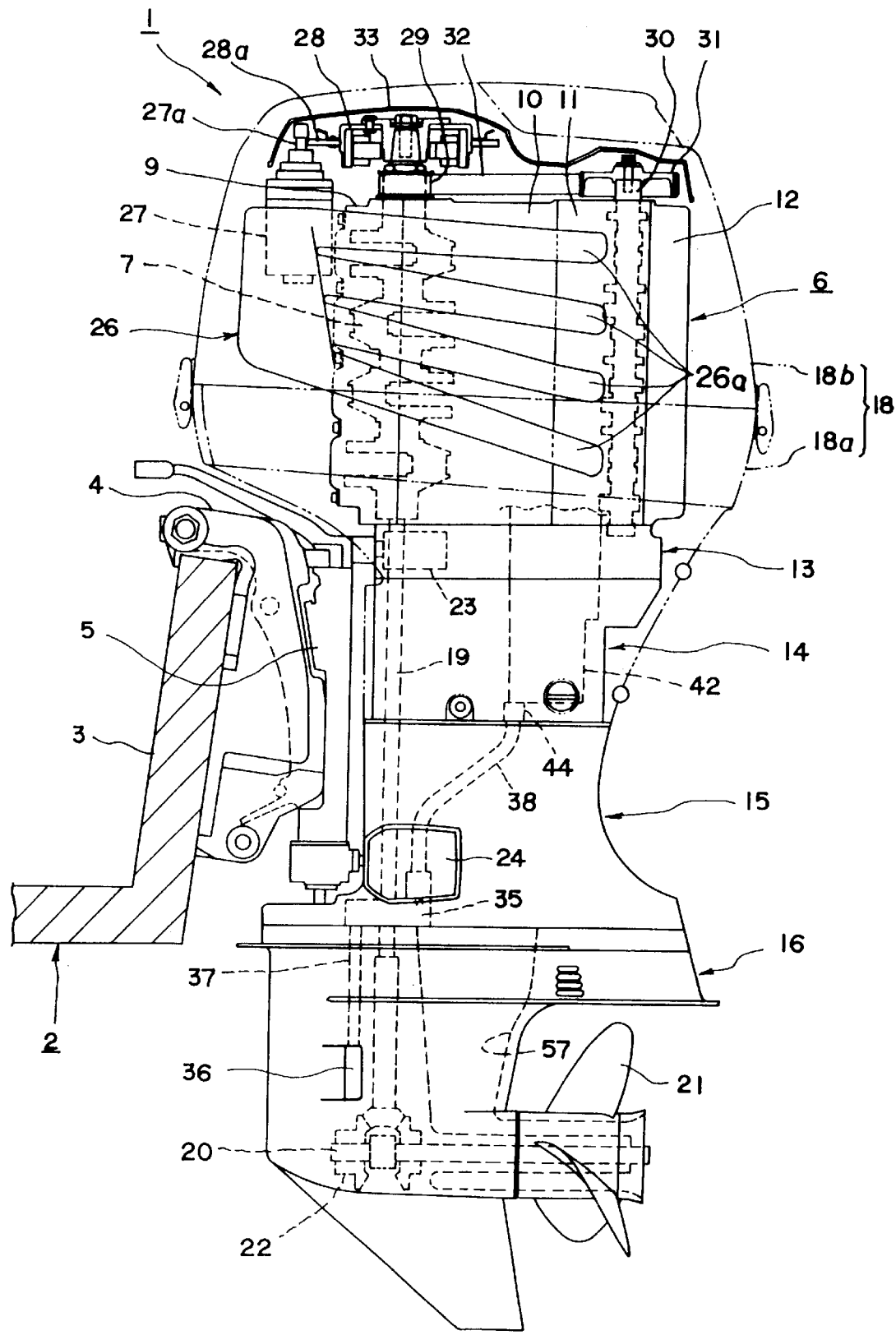
FIG. 1 is a left side view showing an example of an outboard motor provided with a cooling apparatus according to the present invention.

With reference to FIG. 1, an outboard motor 1 is mounted on a transom 3 of a hull 2 through a crank bracket 4 in such a manner that the outboard motor 1 is able to turn horizontally about a swivel shaft 5 vertically disposed in the rear portion of the crank bracket 4.

An engine 6 mounted in the uppermost portion of the outboard motor 1 is, for example, an in-line, four-cylinder, water-cooled and four-stroke-cycle gasoline engine, the engine 6 being mounted vertically in such a manner that a crank shaft 7 of the engine 6 is positioned vertically. The engine 6 is assembled in such a manner that a crank case 9, a cylinder block 10, a cylinder head 11, a head cover 12 and the like are disposed sequentially in the longitudinal direction.

An oil pan 14 is secured to the lower portion of the engine 6 through an engine holder 13 formed into a thick plate-like shape. A drive-shaft housing 15 is secured to the lower portion of the oil pan 14, and a gear housing 16 is secured to the lower portion of the drive-shaft housing 15.

The engine 6, the engine holder 13 and the oil pan 14 are covered with an engine cover 18 which can be sectioned vertically. The engine cover 18 has a lower cover 18a, secured to spread over the engine holder 13 and the oil pan 14, and an upper cover 18b detachably attached above the lower cover 18a. When maintenance of the engine 6 or the like is performed, the upper cover 18b is removed.

A rotational drive shaft 19 extending downwards is integrally connected to the lower end of the crank shaft 7 of the engine 6. The drive shaft 19 is allowed to penetrate the engine holder 13, the oil pan 14 and the drive-shaft housing 15 to reach the inside portion of the gear housing 16.

On the other hand, a propeller shaft 20 extending longitudinally is rotatively supported in the gear housing 16, and a rotational propeller 21 is integrally connected to the rear end of the propeller shaft 20. A bevel gear mechanism 22 disposed at the intersection between the drive shaft 19 and the propeller shaft 20 transmits rotations of the drive shaft 19 to the propeller shaft 20 so that the propeller 21 is rotated.

Further, a pair of Note that right and left mounting portions 23 and 24 are formed in the front ends of the engine holder 13 and the drive-shaft housing 15. The vertical mounting portions 23 and 24 are pivotally supported at the upper and lower ends of the swivel shaft 5.

Figure 5:
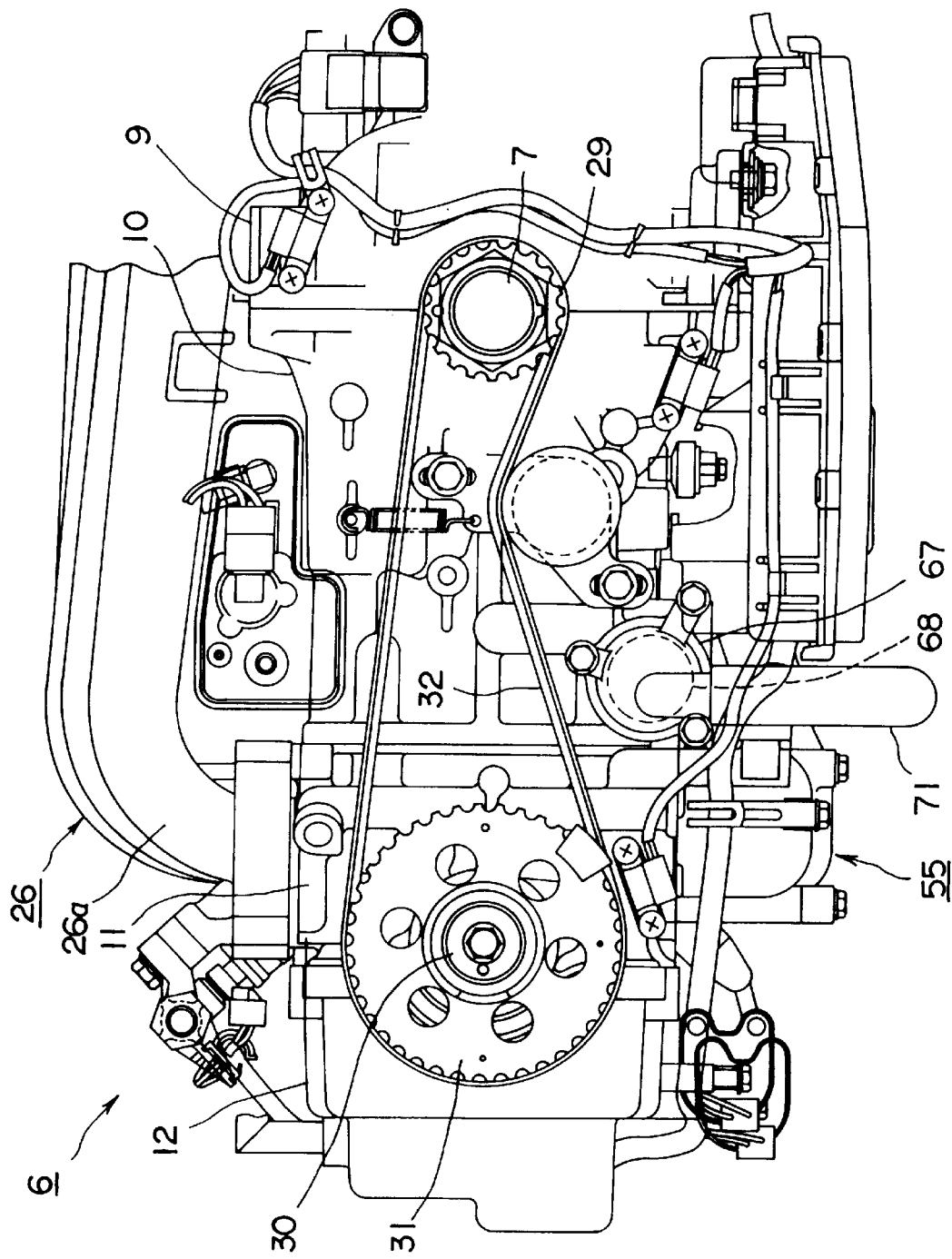
FIG. 5 is a top view of the engine.

An air intake unit 26 is attached to the left side surface, as viewed, of the engine 6. A starter motor 27 for starting the engine 6 is disposed on the front surface of the engine 6. The upper end of the crank shaft 7 projects upwards over the upper surface of the engine 6. A rotational flywheel 28 is integrally mounted at the upper end of the crank shaft 7, while a drive pulley 29 is disposed below the flywheel 28. On the other hand, a camshaft 30 is pivotally disposed in the cylinder head 11 to be in parallel to the crank shaft 7. An upper end of the camshaft 30 projects over the upper surface of the engine 6. A rotational driven pulley 31 is integrally mounted to the projecting portion as shown in FIG. 5.

A timing belt 32 is arranged between the drive pulley 29 of the crank shaft 7 and the driven pulley 31 of the camshaft 30. The timing belt 32 transmits rotations of the crank shaft 7 to the camshaft 30 so that a valve gear unit, not shown, accommodated in the cylinder head 11 is operated.

A flange-shaped ring gear 28a is disposed around the flywheel 28 so that a pinion gear 27a of the starter motor 27 projects upwards to be engaged with the ring gear 28a when the starter motor 27 has been rotated. As a result, the crank shaft 7 is rotated so that the engine 6 is started.

A cover 33 made of synthetic resin or the like is disposed to cover the starter motor 27, the flywheel 28, the drive pulley 29, the driven pulley 31, the timing belt 32 and the like from an upper side so that water drops are blocked by the cover 33 to protect the inside portion from water.

A water pump 35 is disposed on the upper surface of the gear housing 16. The drive shaft 19 also serves as the drive shaft of the water pump 35. A water inlet 36 is formed in the side surface of the gear housing 16. A water-inlet passage 37 formed to extend upwards from the water inlet 36 is connected to the water pump 35. An upper end of a water supply pipe 38 extending upwards from the water pump 35 is connected to the lower surface of the oil pan 14.

Figure 2:
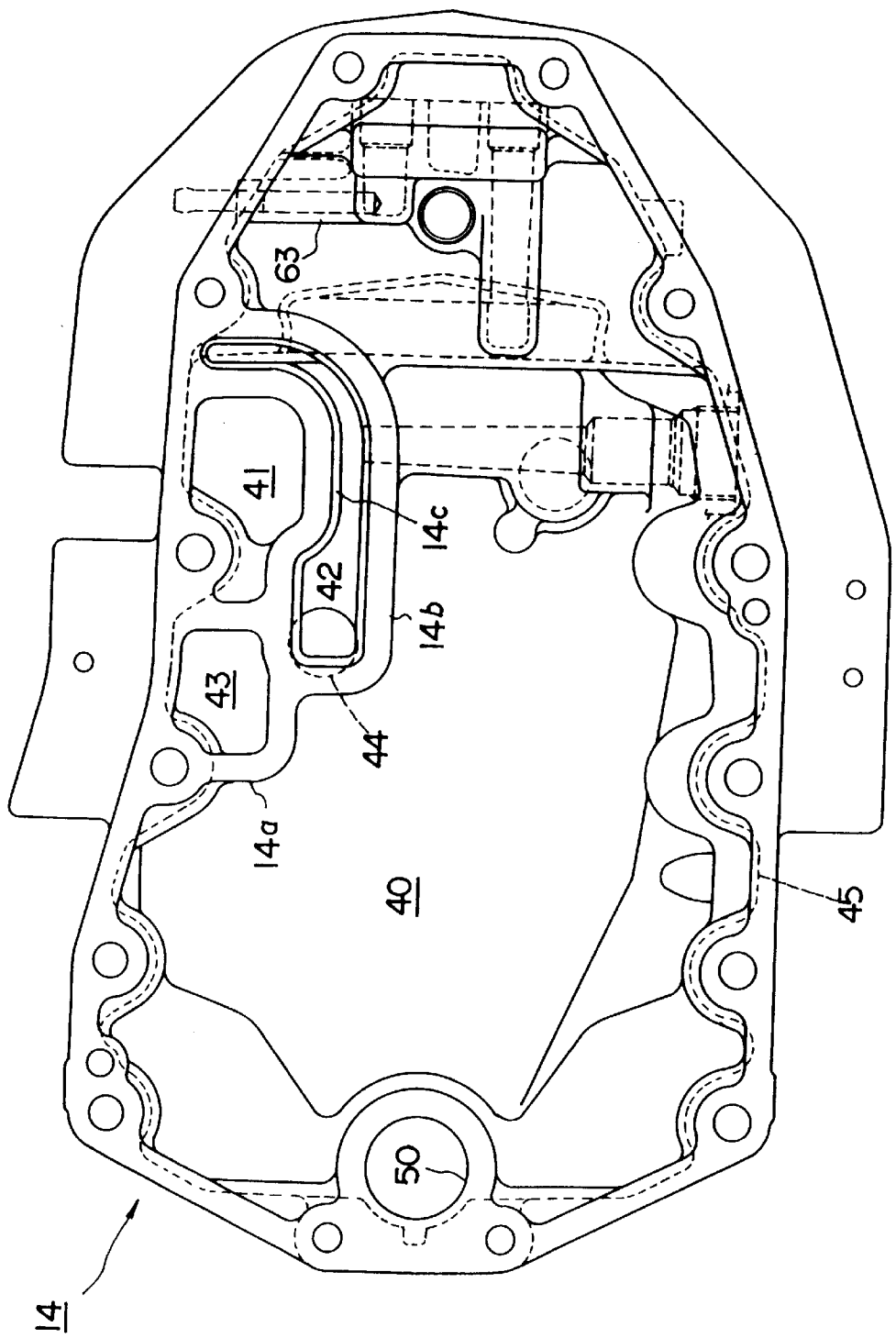
FIG. 2 is a top view of an oil pan of the outboard motor of FIG. 1.
Figure 3:
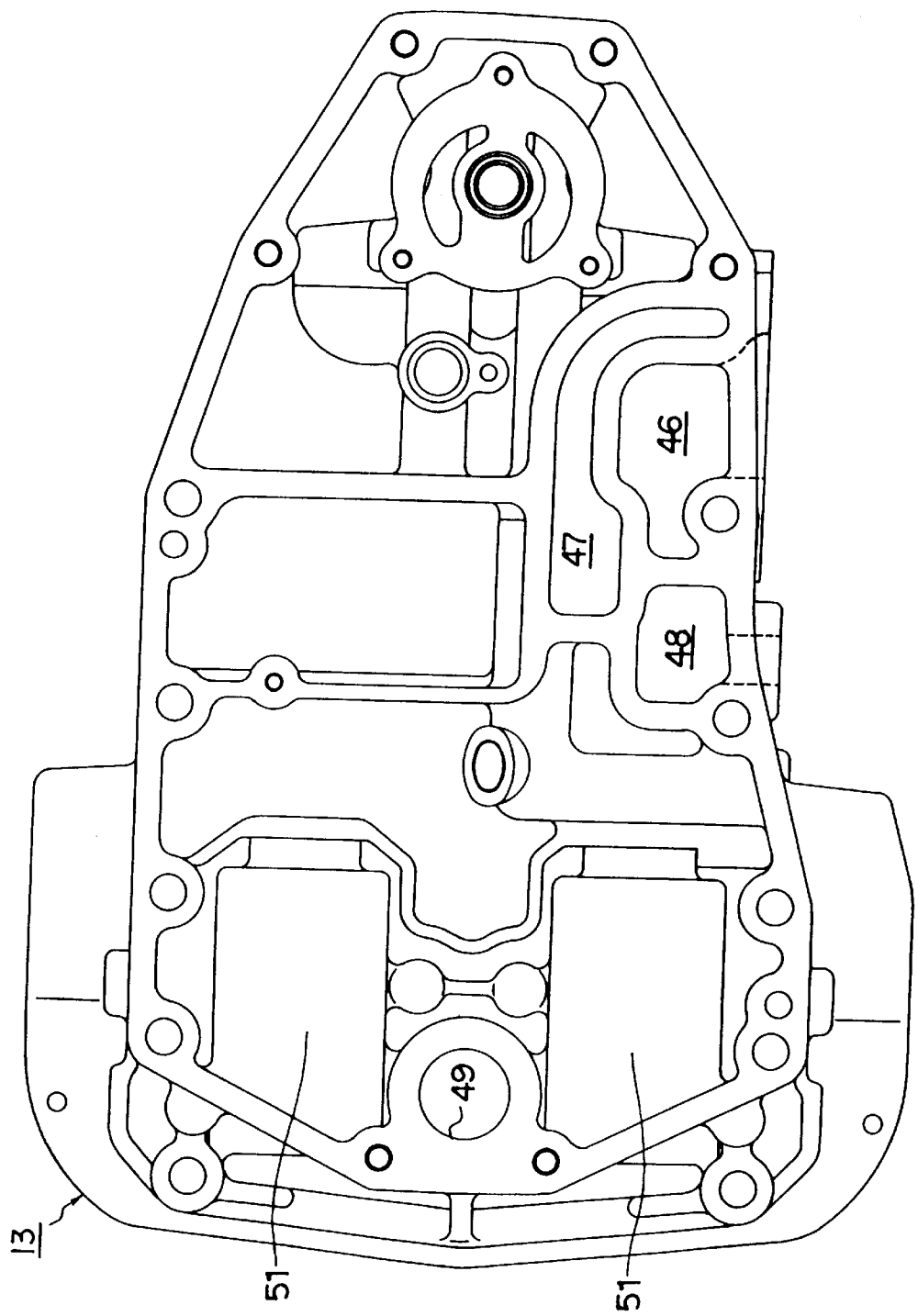
FIG. 3 is a bottom view of an engine holder of the outboard motor of FIG. 1.

FIG. 2 is a top view of the oil pan 14. FIG. 3 is a bottom view of the engine holder 13. As shown in FIG. 2, the major portion of the inside space of the oil pan 14 is occupied by an oil accumulating tank 40. For example, an exhaust passage 41, a water-supply passage 42 and a water drainage passage 43 are formed in the right-hand portion in the oil pan 14. The passages 41, 42 and 43 extend downwards from the engine 6 to vertically penetrate the inside portion of the oil pan 14, the passages 41, 42 and 43 being formed integrally with the oil pan 14 by forming vertical walls 14a, 14b and 14c in the oil pan 14.

The water-supply passage 42 and the water drainage passage 43 are formed to surround the exhaust passage 41. For example, the water-supply passage 42 is formed to have an L-like planer shape. The exhaust passage 41 is formed on the inside of the corner of the L-shape water-supply passage 42, while the water drainage passage 43 is formed in front of the exhaust passage 41.

A water-supply joint 44 is formed in the bottom of the water-supply passage 42. An upper end of the water supply pipe 38 extending from the water pump 35 is connected to the water-supply joint 44. Further, an oil drain port 45 for discharging oil in the oil accumulating tank 40 is formed in the lower portion of the left-hand side surface of the oil pan 14.

As shown in FIG. 3, the engine holder 13 has an exhaust opening 46, a water supply opening 47 and a water drain opening 48 corresponding to the exhaust passage 41, the water-supply passage 42 and the water drainage passage 43 of the oil pan 14. Further, drive-shaft insertion openings 49 and 50, through which the drive shaft 19 is inserted, are formed at the front ends of the engine holder 13 and the oil pan 14. Moreover, a pair of right and left mounting members 51 are formed in the front portion of the engine holder 13 to permit the mounting portion 23 to be mounted to the mounting members 51.

Figure 4:
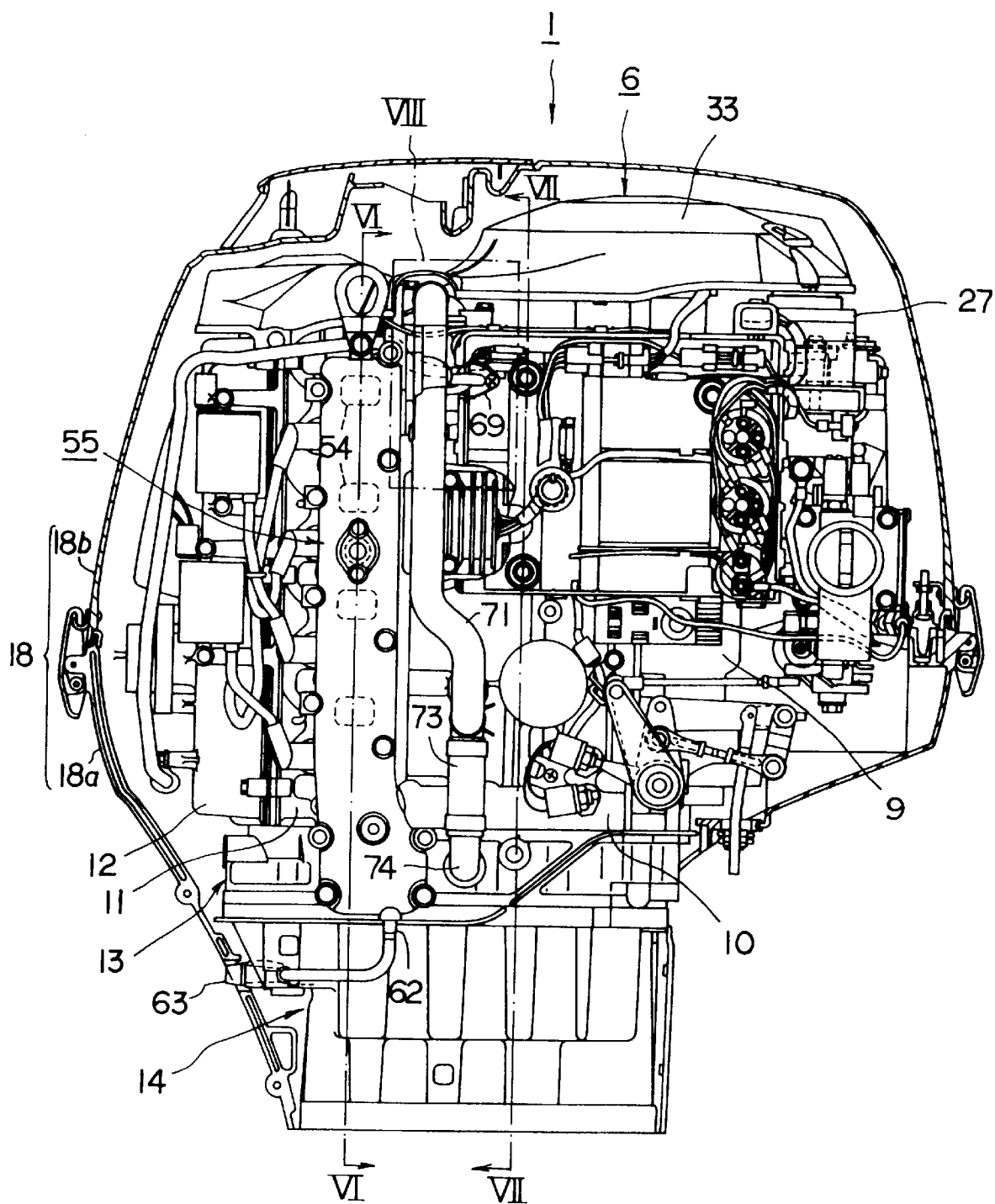
FIG. 4 is a right side view showing an engine, the engine holder and the oil pan.
Figure 6:
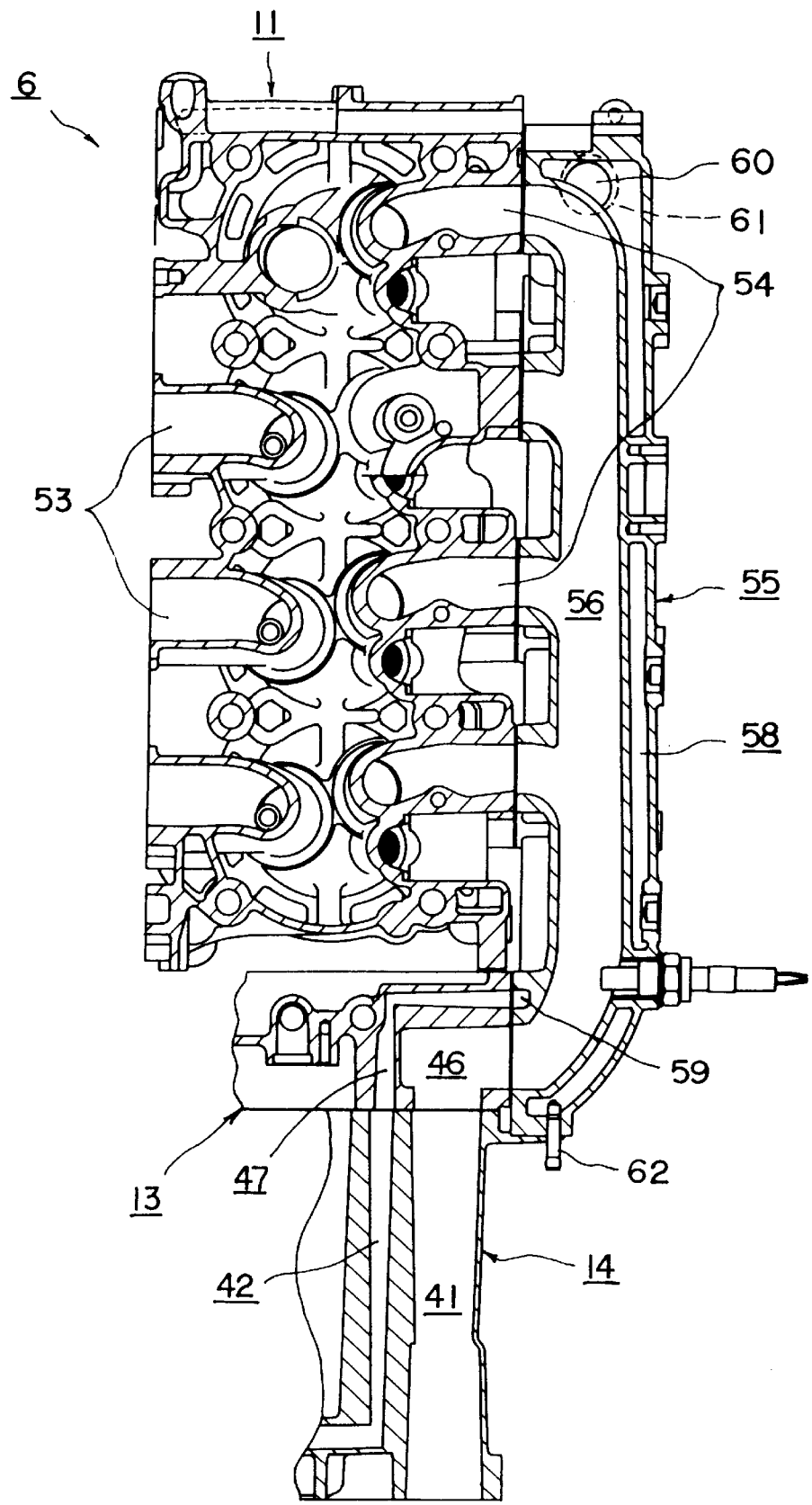
FIG. 6 is a vertical sectional view taken along the line VI—VI shown in FIG. 4.

As shown in FIG. 6, four suction ports 53 are formed in the left side surface of the cylinder head 11 of the engine 6. Four exhaust ports 54 shown in FIG. 4 are formed in the right side, as viewed, surface of the cylinder head 11. Four suction branches 26a of the air intake unit 26 are connected to the suction ports 53, while an exhaust manifold 55 is secured to the exhaust ports 54.

An exhaust collector passage 56 is formed in the exhaust manifold 55. The exhaust ports 54 are collected to the exhaust collector passage 56. The lower end of the exhaust manifold 55 overlaps the right surface of the engine holder 13. The lowermost end of the exhaust collector passage 56 is warped toward the engine holder 13 and connected to the exhaust opening 46 opened in the left surface of the engine holder 13. Thus, an exhaust passage is formed in the sequential order as the exhaust ports 54, the exhaust collector passage 56, the exhaust opening 46 and the exhaust passage 41.

As shown in FIG. 1, an exhaust outlet passage 57 is formed in the drive-shaft housing 15 and the gear housing 16. The lower end of the exhaust passage 41 of the oil pan 14 is opened in the upper portion of the exhaust outlet passage 57.

An end of the exhaust outlet passage 57 is allowed to communicate with the outside from the central portion of the propeller 21. Exhaust gas discharged from the exhaust passage 41 is introduced into the exhaust outlet passage 57 so as to be expanded, and then discharged from the central portion of the propeller 21 to the outside into water.

Figure 9:
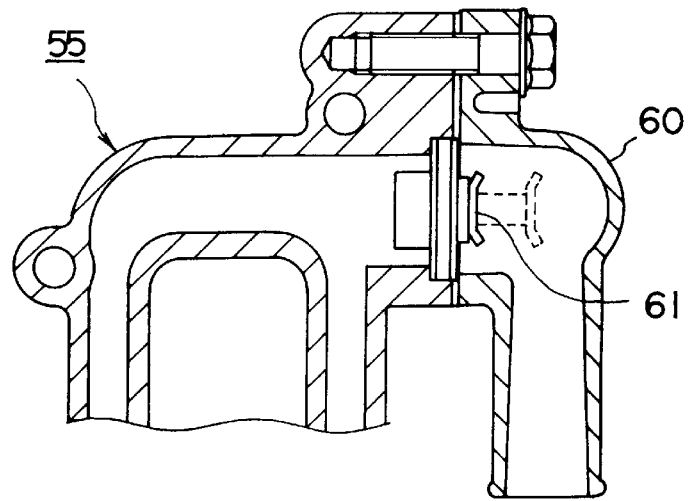
FIG. 9 is a vertical sectional view taken along the line IX—IX shown in FIG. 7.

An exhaust water jacket 58, through which cooling water flows, is formed around the exhaust collector passage 56. An inlet 59 is formed in the lowermost portion of the exhaust water jacket 58, while an outlet 60 is formed in the uppermost portion. As shown in FIG. 9, a pressure valve 61 is disposed in the outlet 60. Further, a water testing opening 62 is formed in the lowermost portion of the exhaust water jacket 58. The water testing opening 62 and a release opening 63 formed in the trailing end of the oil pan 14 are connected to each other through a hose as shown in FIG. 4.

Figure 7:
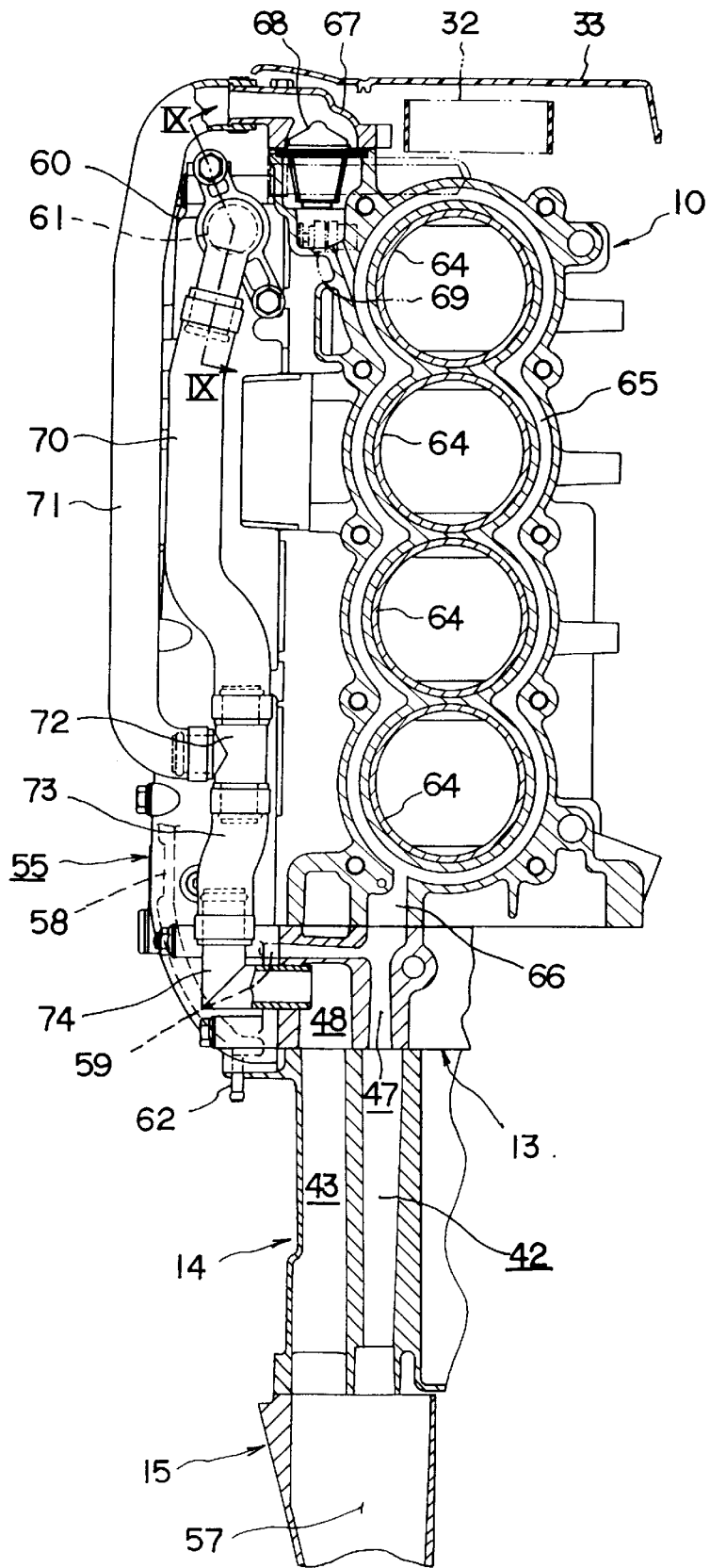
FIG. 7 is a vertical sectional view taken along the line VII—VII shown in FIG. 4.

As shown in FIG. 7, four cylinders 64 are disposed in the cylinder block 10. A block water jacket 65, through which cooling water flows, is formed so as to surround the cylinders 64. An inlet 66 is formed in the lowermost portion of the block water jacket 65, while an outlet 67 is formed in the uppermost portion of the block water jacket 65. The outlet 67 accommodates a thermostat 68.

The inlets 59 and 66 of the exhaust water jacket 58 and the block water jacket 65 are, through a water supply opening 47 of the engine holder 13, connected to the water-supply passage 42 of the oil pan 14. Water drainage hoses 70 and 71 disposed to pass through the outside portion of the engine 6 are connected to the outlets 60 and 67. The other ends of the water drainage hoses 70 and 71 are joined to a water drainage hose 73 by a T-shape joint 72. The water drainage hose 73 is connected to the water drain opening 48 of the engine holder 13 through an L-shape joint 74, and then connected to the water drainage passage 43 of the oil pan 14. Further, the water drainage hoses 70, 71 and 73, the T-shape joint 72 and the L-shape joint 74 are collectively disposed on the side surface (i.e. right surface) of the engine 6.

Figure 10:
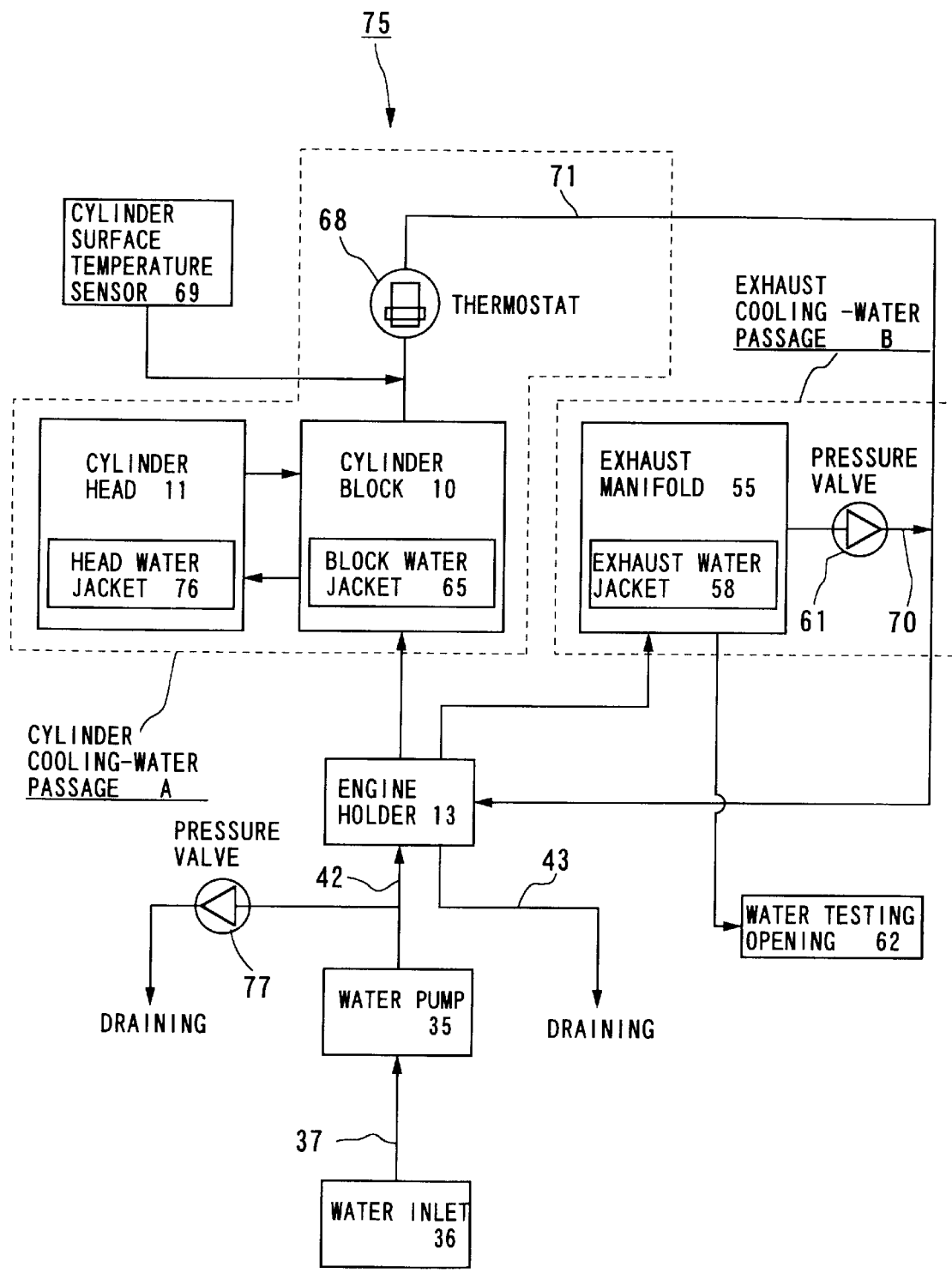
FIG. 10 is a block diagram showing an embodiment of a cooling apparatus according to the present invention.

Therefore, a cooling apparatus 75 as shown in FIG. 10 will be formed, in which the block water jacket 65 is connected to a head water jacket 76 formed in the cylinder head 11 so that the cooling water is communicated between the block water jacket 65 and the head water jacket 76. Further, a cylinder-surface-temperature sensor 69 is disposed between the block water jacket 65 and the thermostat 68.

Thus, a cylinder cooling-water passage A is formed which includes the block water jacket 65, the head water jacket 76, the thermostat 68 and the water drainage hose 71. On the other hand, an exhaust cooling-water passage B is formed which includes the exhaust water jacket 58, the pressure valve 61 and the water drainage hose 70.

The cylinder cooling-water passage A is a passage for supplying cooling water supplied from the water pump 35 to the block water jacket 65 and the head water jacket 76. On the other hand, the exhaust cooling-water passage B is a passage for supplying cooling water supplied from the water pump 35 to the exhaust water jacket 58. The cooling-water passages A and B are formed individually from each other and arranged to have downstream portions which are joined together in a portion including the T-shape joint 72 and the water drainage hose 73.

When the engine 6 has been started, the water pump 35 is operated attributable to rotations of the drive shaft 19 so that external water is, as cooling water, sucked through the water inlet 36 of the gear housing 16 into the water pump 35 so as to be supplied to the water supply pipe 38 under pressure. The cooling water flows through the water-supply passage 42 of the oil pan 14 and the water supply opening 47 of the engine holder 13 and is then branched into the cylinder cooling-water passage A and the exhaust cooling-water passage B. Thus, the exhaust water jacket 58, the block water jacket 65 and the head water jacket 76 are cooled down.

The cooling water allowed to flow through the cylinder cooling-water passage A and the exhaust cooling-water passage B are joined at the T-shape joint 72, and then introduced into the water drain opening 48 of the engine holder 13 and the water drainage passage 43 of the oil pan 14, after which the cooling water is discharged to the outside through the exhaust outlet passage 57. Further, a pressure valve 77 is disposed between the water pump 35 and the engine holder 13, as shown in FIG. 10.

The thermostat 68 is closed when the engine 6 is in a state of stoppage, and when the temperature of cooling water in the block water jacket 65 and the head water jacket 76 has been raised to a predetermined level after start of the engine 6, the thermostat 68 is opened to permit cooling water to pass through. As a result, time required for the engine 6 to be warmed up can be shortened and the supercooling of the cylinders 64 can be prevented during the operation.

Since the pressure in the portion downstream from the water pump 35 is raised excessively during the period in which the thermostat 68 is opened, the pressure valve 77 is opened to relieve excess pressure (cooling water) to the outside so that the cooling water passage can be protected.

The thermostat 68 is disposed in the right-hand portion of the upper surface of the cylinder block 10, as shown in FIG. 5. As shown in FIG. 7, the thermostat 68 is disposed at a position higher than the uppermost portions of the block water jacket 65 and the head water jacket. In addition, the position of the thermostat 68 is made to be lower than the upper end of the timing belt 32. The portion of the outlet 67 in which the thermostat 68 is included is covered with the cover 33.

Figure 8:
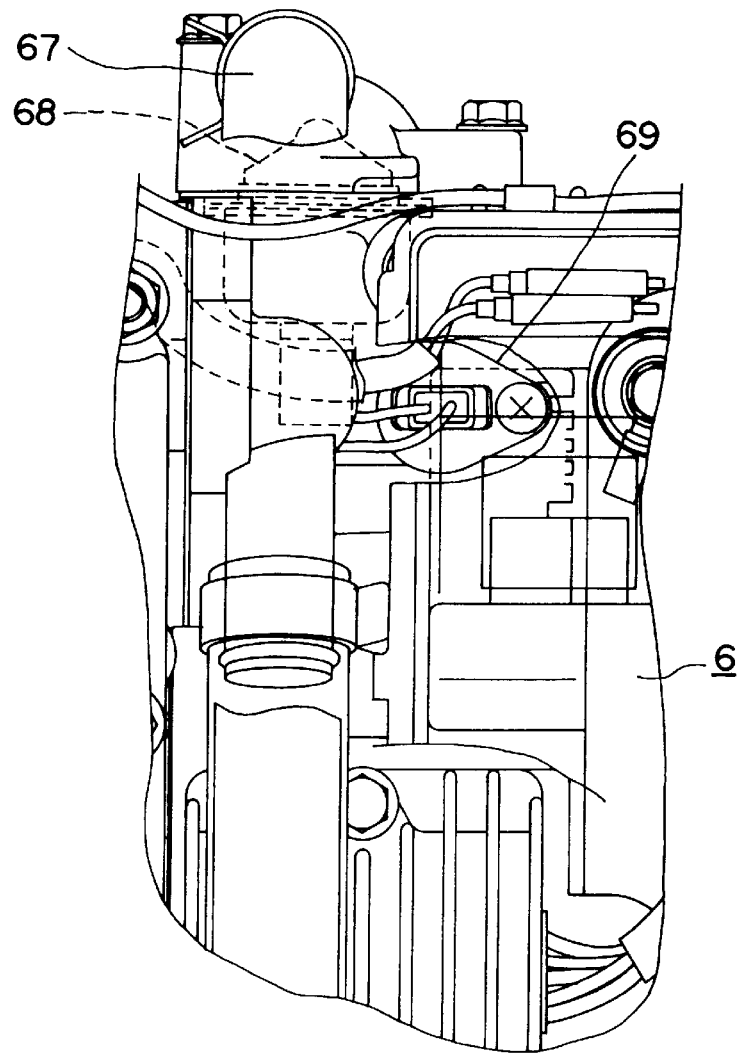
FIG. 8 is an enlarged view of portion VIII shown in FIG. 4.

As shown in FIGS. 7 and 8, the cylinder-surface temperature sensor 69 is disposed adjacent to the thermostat 68. The pressure valve 61 of the exhaust water jacket 58 is also disposed adjacent to the thermostat 68.

The cooling apparatus 75 of the outboard motor 1 has the structure mentioned above. Accordingly, since the independent cylinder cooling-water passage A and the exhaust cooling-water passage B are provided for the cooling apparatus 75 and the downstream portions of the cylinder cooling-water passage A and the exhaust cooling-water passage B are joined, introduction of hot cooling water, which has cooled the exhaust manifold down, into the block water jacket 65 and the head water jacket 76 can be prevented as has been experienced with the conventional outboard engine.

Therefore, the temperature of the cooling water which flows around the block water jacket 65 can be stabilized at adequate levels so that the performance for cooling the portion including the block water jacket 65 is improved. Moreover, the thermostat 68 is able to easily control the temperature.

As described above, the cooling apparatus 75 is arranged in such a manner that the thermostat 68 provided for the cylinder cooling-water passage A is positioned higher than the uppermost portions of the block water jacket 65 and the head water jacket and lower than the top end of the timing belt 32. Therefore, excessive projection of the thermostat 68 over the upper portion of the engine 6 can be prevented. Thus, undesirable enlargement of the size of the engine 6 can be prevented.

Since the cooling apparatus 75 is structured in such a manner that the cylinder-surface-temperature sensor 69 is disposed adjacent to the thermostat 68, the cylinder-surface-temperature sensor 69 is able to stably detect the temperature. As a result, the temperature of the cooling water can easily and accurately be controlled. If the thermostat 68 produces trouble, the trouble can immediately be detected by the cylinder-surface-temperature sensor 69.

Since the cooling apparatus 75 is structured in such a manner that the pressure valve 61 is also disposed adjacent to the thermostat 68, the water drainage hoses 70 and 71 extending from the thermostat 68 and the pressure valve 61 respectively are disposed adjacently. As a result, the cooling apparatus 75 including the water drainage hoses 70 and 71 can easily be assembled and the maintenance of the same can smoothly be performed.

The cooling apparatus 75 is arranged in such a manner that the flow of the joined cylinder cooling-water passage A and the exhaust cooling-water passage B is introduced into the water drainage passage 43 adjacent to the exhaust passage 41 provided in the oil pan 14. Therefore, the cooling water, which has cooled the water jackets 58, 65 and 76 down, is able to cool the water drainage passage 43. Thus, the necessity of enlarging the quantity of cooling water to cool the water drainage passage 43 can be eliminated.

Since the quantity of the cooling water is not enlarged, the block water jacket 65 and the head water jacket 76 are not cooled down excessively. That is, the water drainage passage 43 can be cooled down without arising the problem that the block water jacket 65 is cooled down excessively.

The cooling apparatus 75 is structured in such a manner that the downstream passages of the block water jacket 65, the head water jacket 76 and the exhaust water jacket 58 are, in the cylinder cooling-water passage A and the exhaust cooling-water passage B, formed by the water drainage hoses 70, 71 and 73 which are disposed on the outside of the engine 6. Moreover, since the water drainage hoses 70, 71 and 73 are collectively disposed on the side surface of the engine 6, the necessity of forming passages for returning cooling water in the cylinder block 10, the cylinder head 11 and the exhaust manifold 55 can be eliminated.

As a result, the structure of the passages for cooling water in the cylinder block 10, the cylinder head 11 and the exhaust manifold 55 can be simplified and easily be manufactured. Since the operation for piping the water drainage hoses 70, 71 and 73 can easily be performed, the cooling apparatus 75 can significantly easily be assembled and the maintenance of the same can smoothly be performed.

As described above, the cooling apparatus for an outboard motor according to the present invention is structured in such a manner that the cylinder cooling-water passage for supplying cooling water from the water pump to the water jackets in the cylinder block and the cylinder head and the exhaust cooling-water passage for supplying cooling water from the water pump to the water jacket in the exhaust manifold are formed independently. Moreover, the downstream portions of the cylinder cooling-water passage and the exhaust cooling-water passage are joined together. Therefore, the temperature of cooling water which flows around the cylinder can be stabilized to adequate levels so that the performance for cooling the portion including the cylinder is improved. In addition, the thermostat is enabled to easily control the temperature.

It is to be noted that the present invention is not limited to the described embodiment and many other changes and modifications may be made without departing from the scopes of the appended claims.

What is claimed is:

1. A cooling apparatus for an outboard motor which is provided with a water-cooled engine in a vertical alignment in which a crank shaft is vertically disposed, said engine being composed of a cylinder block, a cylinder head and an exhaust manifold into which water jackets are formed respectively and said water jackets are supplied with cooling water from a water pump disposed below the engine in a state mounted to a hull, wherein a cylinder cooling-water passage for supplying cooling water from the water pump to the water jackets of said cylinder block and said cylinder head and an exhaust cooling-water passage for supplying cooling water from the water pump to the water jacket of said exhaust manifold are independently disposed from each other, said cylinder cooling-water passage and said exhaust cooling-water passage are joined together at downstream portions thereof.

2. A cooling apparatus for an outboard motor according to claim 1, wherein said cylinder cooling-water passage is provided with a thermostat at a position higher in level than uppermost portions of the water jackets of said cylinder block and said cylinder head and lower in level than a top end of a timing belt disposed on an upper surface of the engine, in the mounted state of an outboard motor to a hull, and a sensor for detecting a cylinder surface temperature and a pressure valve are disposed adjacent to said thermostat.

3. A cooling apparatus for an outboard motor according to claim 1, wherein said cylinder cooling-water passage and said exhaust cooling-water passage are joined so that the cooling-water flow after the joined portion thereof is introduced into a water drainage passage formed adjacent to an exhaust passage disposed vertically so as to penetrate an inside portion of an oil pan which is disposed below said engine in an installed state.

4. A cooling apparatus for an outboard motor according to claim 1, wherein said cylinder cooling-water passage and said exhaust cooling-water passage are provided with passages on downstream sides of said water jackets, said downstream side passages being formed of drainage hoses, respectively, which are collectively disposed on one side surface of the engine.

5. A cooling apparatus for an outboard motor which is provided with a water-cooled engine in a vertical alignment in which a crank shaft is vertically disposed, said engine being composed of a cylinder block, a cylinder head and an exhaust manifold into which water jackets are formed respectively and said water jackets are supplied with cooling water from a water pump disposed below the engine in a state mounted to a hull, said cooling apparatus comprising:

a cylinder cooling-water passage for supplying cooling water from the water pump to the water jackets of said cylinder block and said cylinder head;

an exhaust cooling-water passage for supplying cooling water from the water pump to the water jacket of said exhaust manifold, said cylinder cooling-water passage and said exhaust cooling-water passage being independently disposed from each other and being joined together at downstream portions thereof;

means for controlling a temperature of the cooling-water passing through the cylinder cooling-water passage provided for the water jacket of the cylinder block; and means for detecting a temperature of a cylinder surface provided for the water jacket of the cylinder block at a portion between the water jacket thereof and said temperature controlling means.

6. A cooling apparatus for an outboard motor according to claim 5, wherein said temperature controlling means is a thermostat and said temperature detecting means is a cylinder surface temperature sensor.

7. A cooling apparatus for an outboard motor according to claim 5, wherein said cylinder cooling-water passage and said exhaust cooling-water passage are provided with drainage passages on downstream sides of said water jackets, formed of drainage hoses, respectively, which are collectively disposed on one side surface of the engine.

8. A cooling apparatus for an outboard motor according to claim 7, wherein said cylinder cooling-water passage and said exhaust cooling-water passage have downstream side portions which are joined together through a T-shaped joint and said drainage hoses.

9. A cooling apparatus for an outboard motor according to claim 5, wherein said temperature controlling means is disposed at a position higher in level than uppermost portions of the water jackets of said cylinder block and said cylinder head and lower in level than a top end of a timing belt disposed on an upper surface of the engine in the state of an outboard motor mounted to a hull.

10. A cooling apparatus for an outboard motor according to claim 9, wherein a pressure valve is disposed at a portion adjacent to said temperature controlling means.

* * * * *